United States Patent Office 3,349,241
Patented Oct. 24, 1967

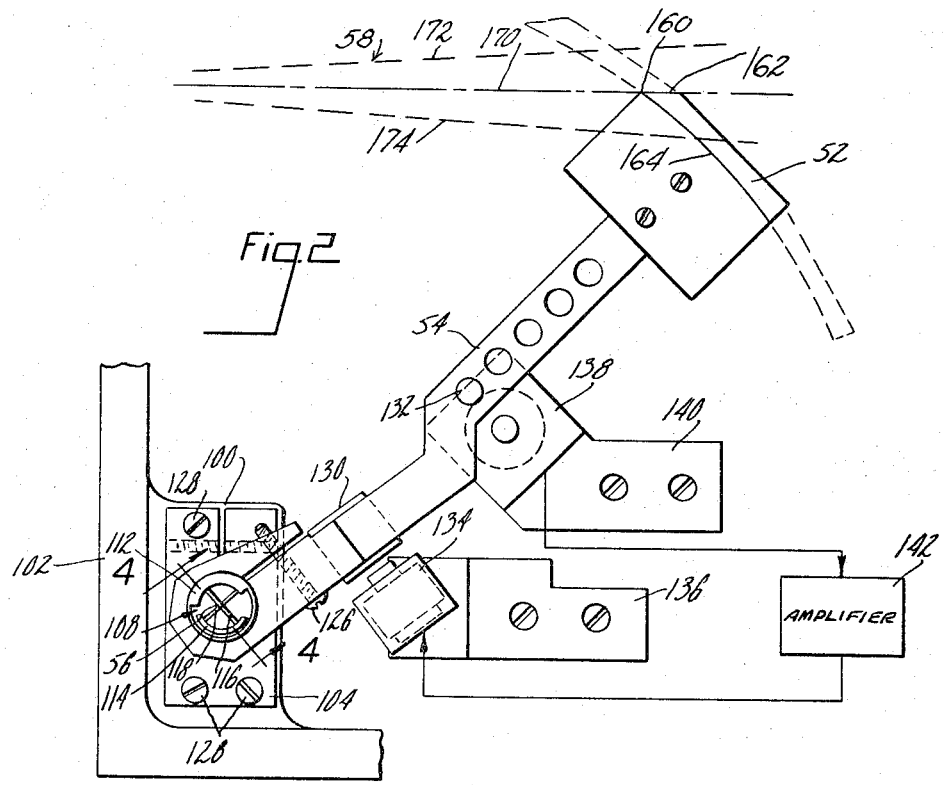
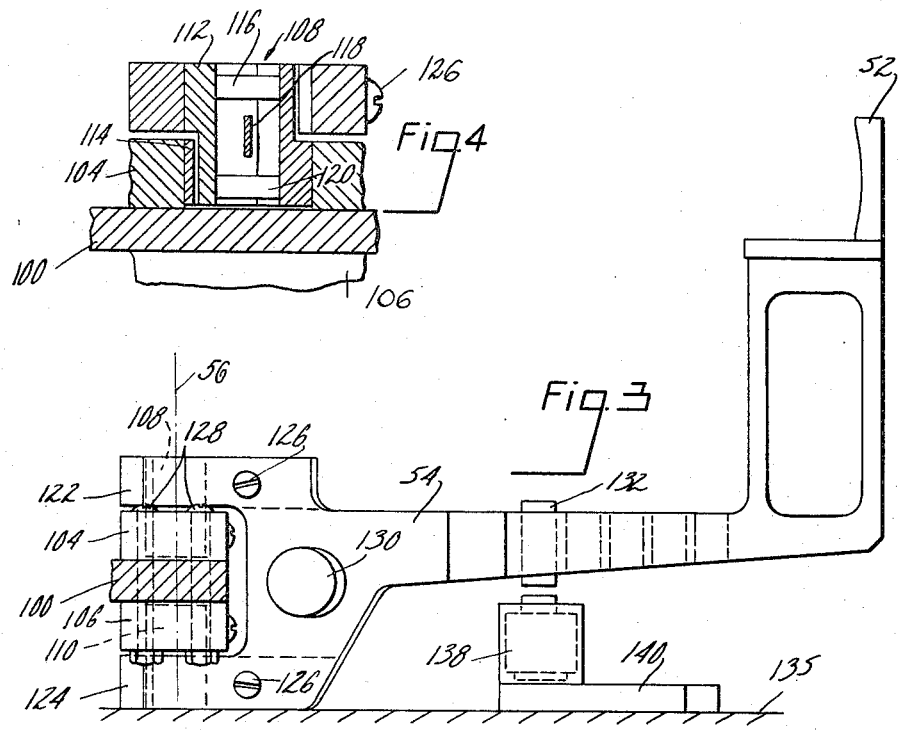

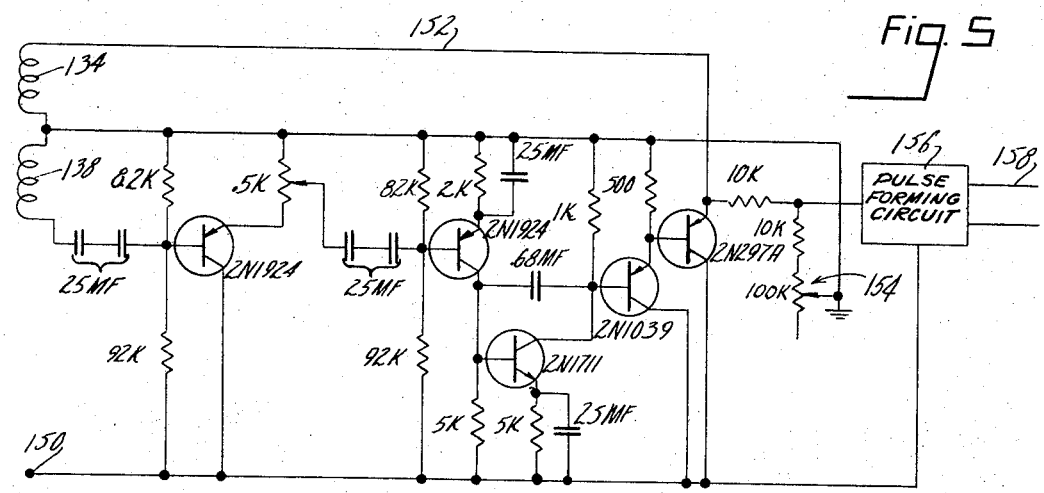
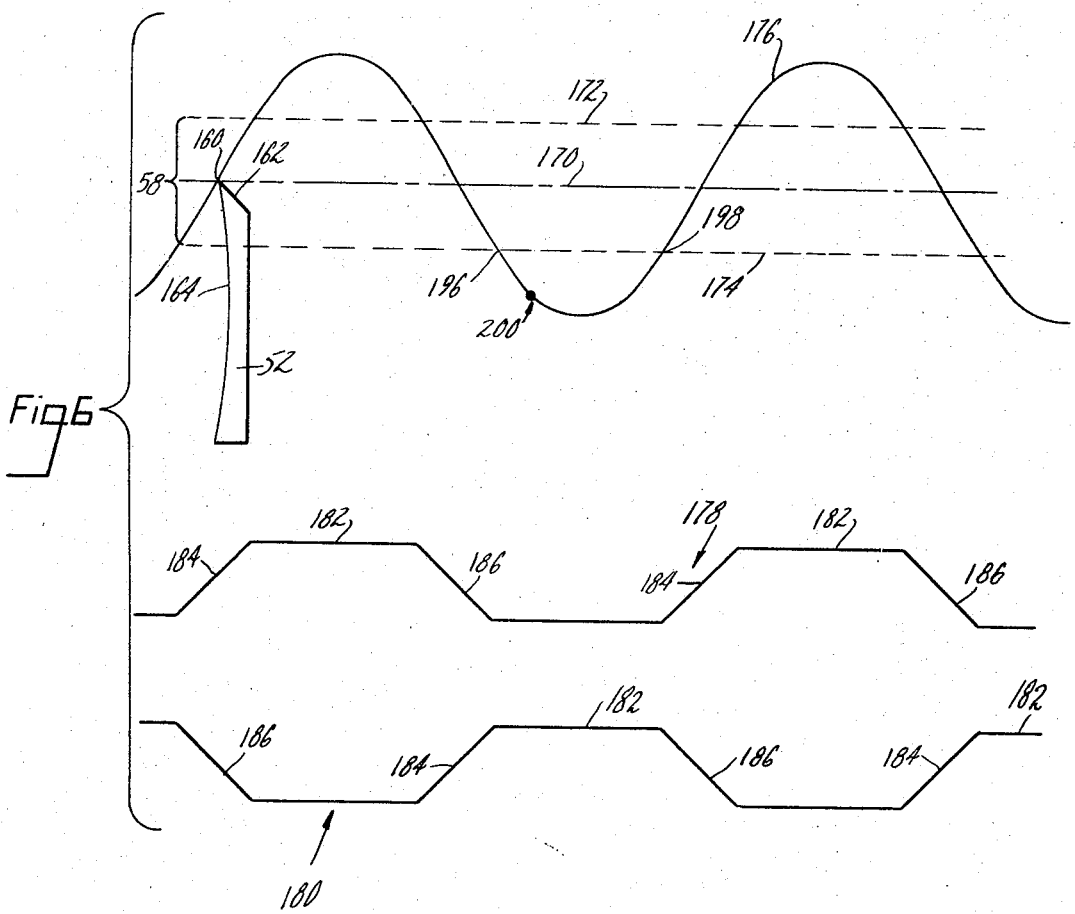

3,349,241
DOUBLE BEAM VACUUM ULTRA-VIOLET SPECTROPHOTOMETER USING A TOROIDAL MIRROR OSCILLATING ABOUT THE CENTER OF CURVATURE
Richard G. Schmitt, Carlisle, and Richard K. Brehm, Lexington, Mass., assignors to Jarrell-Ash Company, Waltham, Mass., a corporation of Massachusetts
Filed Apr. 5, 1965, Ser. No. 445,664
18 Claims. (Cl. 250—43.5)

ABSTRACT OF THE DISCLOSURE

A double beam spectrophotometer designed for operation in the vacuum ultra-violet region includes a monochromator employing a Robin mounting and a double beam chamber connected to the monochromator by an exit slit structure. Two toroidal mirrors are disposed in that chamber, a first mirror (having a radius of curvature about its vertical axis of 152 mm. and a radius of curvature about its horizontal axis of 305 mm.) being fixed to reflect radiation onto a first sensor and the second mirror (having a radius of curvature about its vertical axis of 72 mm. and a radius of curvature about its horizontal axis of 126 mm.) being pivotally mounted on two flexural pivot units for movement between a position reflecting radiation onto a second sensor and a position outside the radiation path. Drive and pickup magnets are mounted for movement with the second mirror and juxtaposed coils sense the movement of the magnets and maintain the second mirror oscillating about its pivot at a predetermined magnitude of a movement with an 11.3 cycle per second rate.

This invention relates to a specimen analysis apparatus and, more especially, to radiation comparison systems particularly useful in spectrophotometry, in which the intensity of radiation emerging from a specimen, whether it be by emission, scattering, reflection, or transmission is measured by a radiation sensor.

In systems for the analysis of a specimen in terms of its response to a beam of radiation, it is conventional to divide a radiation beam for transmission along two distinct paths. The specimen to be analyzed is disposed in one beam path and a reference medium is disposed in the other beam path. The beam may be divided either on a time basis (chopping) or on a quantitative basis (beam-splitting). In spectrophotometric analysis utilizing radiation in the vacuum ultra-violet region, it is desirable to minimize the use of refractive material in the radiation beam path and to evacuate those paths because of the high absorption characteristics of both solids and gases at short wave lengths. Further, the number or reflections required along the beam path should be minimized as energy is lost at each reflection and this energy loss increases with decreasing wave length, particularly below twelve hundred angstroms.

Accordingly, it is an object of this invention to provide novel and improved apparatus for measuring optical characteristics of a specimen.

Another object of the invention is to provide a novel and improved radiation comparison system particularly adapted for use in the vacuum ultra-violet region.

Another object of the invention is to provide a novel and improved spectrophotometric system of the double beam type in which the optical properties of the two beam paths are substantially the same.

In accordance with the invention, there is provided a radiation comparison system in which a radiation beam is divided into two equal portions on a time basis. The radiation beam is directed along a beam path so that it passes along a fixed path through a first sample region. A toroidal mirror is disposed in the beam path in front of the first sample region and when so positioned reflects radiation in the beam path along a second fixed path through a second sample region. The mirror is mounted on a support which is in turn mounted so that as the support moves, the mirror is moved about a center of curvature of the mirror. In this manner the beam, which preferably is focused by the mirror, is stationary in space throughout movement of the mirror. A support drive periodically moves the support about the center of curvature to move the mirror out of the beam path so that the radiation is passed to the first sample region. Thus, an image of an exit slit, for example, is formed and maintained at a fixed location in a sample region by a single optical component that also functions to direct the radiation beam alternately through two different sample regions for comparison purposes. Preferably, a second toroidal mirror is disposed in the beam path between the first toroidal mirror and the first sample region so that the beam passed through the first sample region is influenced in the same manner as the beam passed through the second sample region.

In the particular embodiment described hereinafter in detail, a vacuum ultra-violet spectrophotometer, the mirror support is mounted on springs and the drive is an oscillator which utilizes the mirror support as an integral component of the oscillator and which has a resonant frequency determined principally by the mirror mounting mass and the spring characteristics. The oscillator circuitry also generates a signal indicative of the position of the mirror support so that the response of the sensing circuitry to the light emitted from the sample regions may be synchronized with the position of the mirror.

Radiation comparison apparatus constructed in accordance with the invention and used with a monochromator employing a single reflecting surface produces useful analytical results on specimens down to wave lengths as short as six hundred angstroms. The structure is simple and reliable in operation and is particularly useful in connection with analysis systems which utilize vacuum environments.

Other objects, features, and advantages of the invention will be seen as the following description of a particular embodiment thereof progresses in conjunction with the drawings, in which:

FIGURE 2 is a top view of the mirror support mechanism employed in the spectrophotometer system shown in FIGURE 1;

FIGURE 3 is a side view of the mirror suppor mechanism, partially in section, taken along the line 3—3 of FIGURE 2;

FIGURE 4 is a sectional view taken along the line 4—4 of FIGURE 2 of one of the resilient pivot structures in the mirror support mechanism;

FIGURE 5 is a schematic diagram of the mirror support drive circuitry; and

FIGURE 6 is a graph indicating the motion of the toroidal mirror in and out of the beam path of the spectrophotometer as driven by the circuitry of FIGURE 5 and the resulting transmission into the sample regions.

Figure 1:
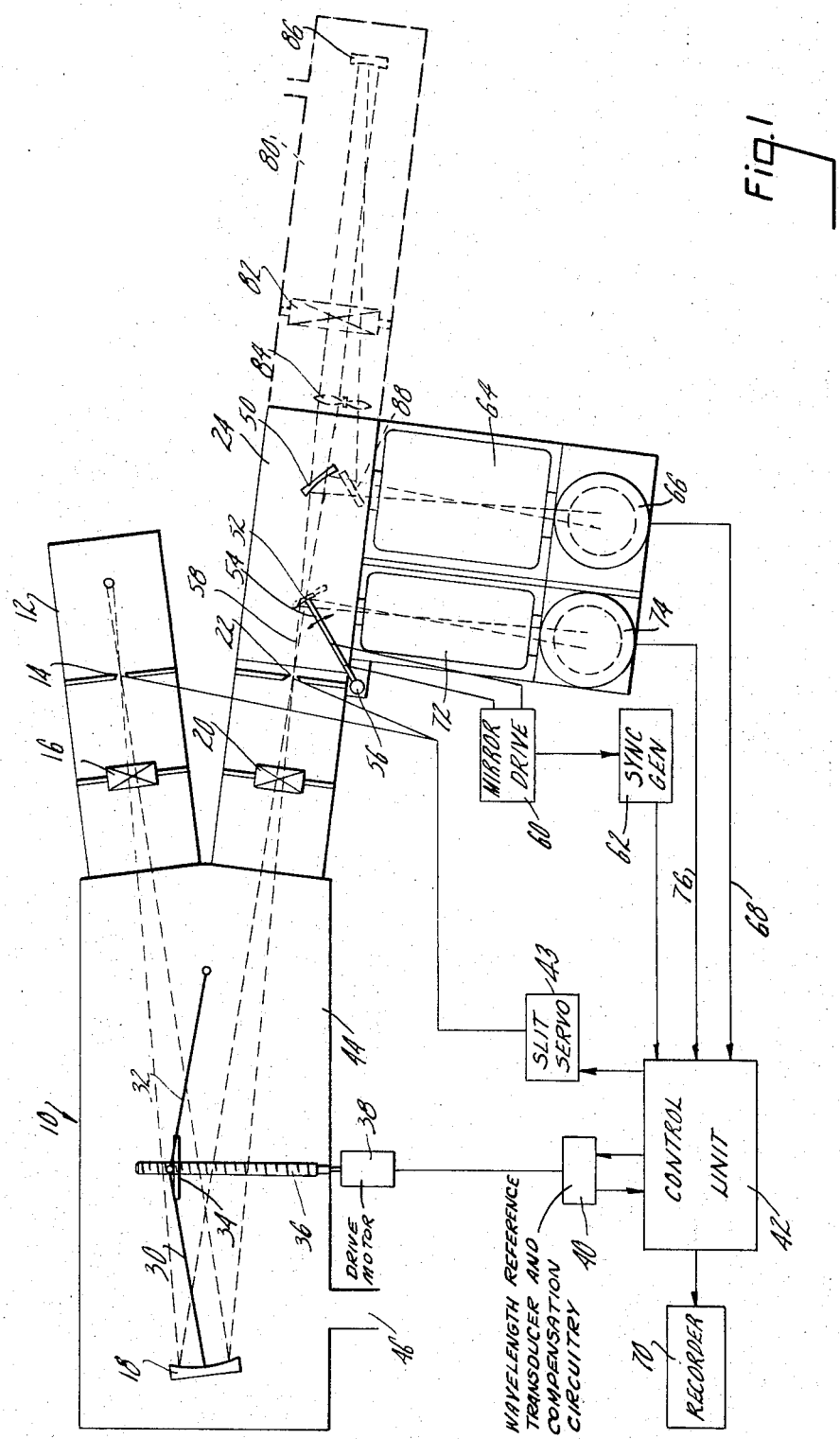
FIGURE 1 is a diagrammatic view of a double beam vacuum ultraviolet spectrophotometer system constructed in accordance with the invention.

With reference to FIGURE 1, there is shown a double beam spectrophotometer particularly adapted for operation in the vacuum ultra-violet region. The spectrophotometer includes a monochromator 10 employing a Robin mounting. Radiation is transmitted from a source unit 12 through an entrance slit diagrammatically indicated at 14 and a vacuum valve 16 for impingement on a grating 18 and reflection thereby through a second vacuum valve 20 and exit slit structure 22 into a double beam chamber 24. The grating 18 is mounted on a linkage having two components 30, 32 pivotally connected together which is moved by a contact flat 34 driven by screw 36. The screw is rotated by a wave length drive motor 38 which is controlled by a wave length reference transducer and compensation circuitry diagrammatically indicated at 40, in response to signals from central control unit 42. That control unit also generates signals to vary the widths of slits 14 and 22 via slit servo unit 43.

The monochromator housing 44 is sealed off by vacuum valves 16 and 20 and is connected to a vacuum system through aperture 46. The double beam chamber is likewise evacuated as it is directly connected to the monochromator chamber when valve 20 is open. Disposed in the double beam chamber is a fixed toroidal mirror 50 and a second toroidal mirror 52 which is mounted on a support arm 54 which in turn is mounted on pivot axis 56. The mirror 52 is oscillated in and out of beam path 58 by mirror drive circuitry 60 which also produces a signal indicative of the mirror position to operate synchronizing generator circuitry 62 which in turn supplies a signal to the control unit 42.

Mirror 50 reflects and focuses the energy in the radiation beam impinging on it at a "sample center" in sample region 64 which typically holds the specimen to be analyzed. Radiation passing through the sample region 64 impinges on a detector 66 (such as a photocell or photomultiplier), and that detector produces a signal over line 68 for application to the control unit 42 and to a recorder 70. In like manner, mirror 52, when disposed in the beam path 58, reflects and focuses energy through a "sample center" in a second sample region 72 in which a reference medium is typically disposed and the light from that sample region impinges on a detector 74 which generates a signal over line 76 for application through the control unit 42 for recording by the recorder 70.

A variety of other apparatus may utilize the structure of the invention. For example, when a long path cell is required, a chamber 80 may be connected to the double beam unit 24 as indicated in dashed lines. This chamber includes an isolating valve 82, two lenses 84, and a mirror 86. It has a separate connection to the vacuum system. The toroidal mirror 50 is moved out of the beam path so that the radiation passes through one lens 84, impinges on mirror 86, and is reflected back through the long path cell and the other lens 84 for impingement on a plane mirror 88 located slightly off the main beam path 58 which reflects the radiation through the first sample region 64 for sensing by detector 66. The many other modifications of the system that may be made include the use of other types of monochromator such as an Ebert mounting; and use of other types of detector arrangements, including a common detector.

The support and drive mechanism for toroidal mirror 52 may be seen with reference to FIGURES 2–4. This mirror has a surface that is formed by rotating a circle or other geometric element about a fixed axis which typically is in the plane of the geometric element. In this particular embodiment, the toroidal surface has two curves, both of which are generated from circles and the surface is characterized by two radii of curvature, one in the plane that includes the axis of rotation and the other in a plane normal thereto. When the two radii of curvature are equal, the resulting surface is spherical, a special case of a toroid. Similarly one or both radii may be infinite, and as such form other special cases of the toroid. In a particular embodiment, mirror 52 has a radius of curvature about the vertical axis of seventy-two millimeters and a radius of curvature about the horizontal axis of one hundred twenty-six millimeters, while the fixed toroidal mirror 50 has a radius of curvature about its vertical axis of one hundred fifty-two millimeters and a radius of curvature about its horizontal axis of three hundred five millimeters.

The support arm 54 is made of aluminum and has a number of holes in it which are provided to reduce its mass. The arm is mounted for rotation about a vertical pivot axis 56 on a support web 100 that projects inwardly from the wall 102 of the double beam chamber. Mounted on web 100 are two clamping blocks 104, 106 which receive flexural pivot units 108, 110. As shown in FIGURE 4, each pivot unit is a frictionless bearing which requires no lubrication and which includes two sleeves 112, 114 that are connected by flat crossed springs 116, 118, 120. Each spring extends from the wall of one sleeve to the wall of the other sleeve and hence supports the two sleeves in axial relation. These three springs permit limited angular movement of the sleeve 112 with respect to the sleeve 114 and produce a restoring force upon angular deflection of one sleeve relative to the other. These units provide an accurately defined pivot axis 56 in a compact unit housed within the evacuated chamber. While such units have advantages of compactness, obviously other rotational pivot structures may also be employed.

The support arm 54 has two clamping ears 122, 124 at its end opposite the mirror 52. Clamping ear 122 engages the upper sleeve 112 of the upper pivot unit 108 and clamping ear 124 engages the lower sleeve of pivot unit 110. Each clamping ear is secured to the sleeve by pressure exerted by screw 126. The other two sleeves are similarly frictionally secured to clamping blocks 104, 106 which in turn are secured to the web 100 by bolts 128.

Mounted in an aperture in the support arm is a drive magnet element 130 and positioned between the drive magnet and the mirror is secured a pickup magnet element 132. Disposed in juxtaposed relation adjacent to the drive magnet 130 is a drive coil structure 134 which is secured to the base 135 of the double beam chamber by a suitable bracket 136. Similarly disposed below the path of the pickup magnet 132 is a pickup coil structure 138 mounted on bracket 140. The output of the pickup coil 138 as applied to an amplifier 142 produces an output to operate the drive coil 134.

The amplifier 142 is shown in the schematic diagram of FIGURE 5. This amplifier circuitry is energized by an adjustable fifteen–twenty-five volt signal provided to enable control of the amplitude of oscillation of the support arm) which is applied at terminal 150, and includes a series of transistor amplification stages for amplifying the signal produced by the pickup coil 138 to produce an output signal which is fed back over line 152 for energizing the drive magnet coil 134. This output signal on line 152 is also applied through a phasing control 154 to operate a pulse forming circuit 156 (e.g. a Schmitt trigger) which applies to the control unit 42 over lines 158 a signal indicative of the position of the mirror 52 for controlling the processing of signals from detectors 66 and 74 to generate an output for application to recorder 70.

The movement of the oscillating mirror for operation of this double beam system is indicated in the diagram of FIGURE 5. (It is preferred that mirror 52 have its leading edge 160 tapered at 162 so that only the reflecting surface 164 will be in the beam path 58.) The preferred rest location of the mirror 52 in a system in which equal amounts of radiation are to be transmitted through the two sample regions is at the center of the beam path 58 (line 170). (Other locations are preferable where the division of radiation between the two sample regions is to be unequal.) The bounds of the beam are indicated by lines 172 and 174. In this arrangement the width of the mirror 52 is twice that of the beam path 58 and the amplitude of motion of the mirror (peak to peak) is twice the width of the beam path. The motion of the leading edge 160 follows the sinusoidal path 176. Curve 178 represents the magnitude of transmission through sample region 72 and curve 180 represents a magnitude of radiation transmission through sample region 64. It will be seen that the radiation transmission curves are trapezoidal in shape having a flat peak portion as at point 182 and inclined leading edge portions 184 and trailing edge portions 186. The shapes and magnitudes of the two curves 178, 180 are identical and they are 180° out of phase with each other. The mirror in rest position reflects one-half of the radiation in beam 58 through region 72 (curve 178) and passes the other half of the radiation for reflection by mirror 50 through region 64 (curve 180). As the mirror 52 moves further into the beam path, the portion of the radiation passing through cell 72 (curve 178) increases until it reaches a maximum and remains at that level until the leading edge 160 of mirror 52 reenters the beam path. The radiation passing through region 72 then starts to decrease until the mirror's leading edge 160 leaves the beam path at point 196 and from there to point 198 all the beam radiation is reflected through region 64 by mirror 50 (curve 180). This oscillatory motion is sinusoidal in form and operates substantially at resonance as a function of mirror support mass and pivot unit spring characteristics.

The oscillatory motion is maintained by the mirror drive circuitry 60. When the mirror is out of the beam path (approximately at point 200) the pickup magnet 132 induces a signal into coil 138 which is amplified by the amplifier circuitry and fed back along line 152 to produce a signal in drive coil 134. This signal produces a magnetic field which repulses drive magnet 130 and the pivoted mirror support arm 54 to reverse the direction of motion of that arm and drive mirror 52 back across the beam path. The energy supplied by drive coil 134 is sufficient to overcome energy loss in the resilient mounting of the support arm so that oscillation of uniform amplitude and rate is maintained. In a particular embodiment a frequency of oscillation of 11.3 cycles per second has been found suitable. Other types of oscillator drive circuits and pulse generators may of course be utilized. A high quality wide band amplifier such as a McIntosh Model M40 has been satisfactorily employed in the feedback link between coils 134 and 138. Similarly a monostable multivibrator might be substituted for the Schmitt trigger. If desired for synchronizing purposes, a second pickup coil may be used to sense a second mirror position for signaling the control unit 42 in manner similar to coil 138.

Obviously it is frequently desired to maximize the amount of light passing through the sample regions and to this end the length of the uniform intensity portions 182 of curves 178 and 180 may be increased by increasing the amplitude of mirror movement.

Thus it will be seen that the invention provides a double beam radiation comparison system that chops divergent radiation of the output beam from a monochromator while maintaining an image of the exit slit in fixed location within each of the two sample regions, and that utilizes only one reflecting surface per beam portion. The apparatus utilizes a toroidal mirror having oscillatory mounting movement of simple harmonic motion, the frequency of which is determined by spring forces and the mass of the mirror assembly. The amplitude of the vibration and the size of the mirror are preferably selected to minimize the time the mirror is moving through the beam width and to maximize the time the mirror is either completely in or completely out of the beam.

While a particular embodiment of the invention has been shown and described, various modifications thereof will be apparent to those skilled in the art and therefore it is not intended that the invention be limited to the disclosed embodiment or to details thereof and departures may be made therefrom within the scope of the invention and defined in the claims.

What is claimed is:

1. Double beam apparatus for use in a photometer system comprising
    means defining a beam path,
    a toroidal mirror disposed in said beam path for reflecting and focusing radiation from said beam path,
    a support for said toroidal mirror, said support including means defining a pivot axis coincident with a center of curvature of said toroidal mirror,
    and a support drive for rotating said support about said pivot axis to move said toroidal mirror out of said beam path.

2. Apparatus as claimed in claim 1 further including spring means for biasing said support to a rest position and wherein said support drive for said toroidal mirror is an oscillatory system that has a resonant frequency as a function of the mass of the toroidal mirror assembly and the characteristics of said spring means.

3. The apparatus as claimed in claim 1 wherein said support drive includes circuitry comprising a sensor for generating a signal in response to movement of said toroidal mirror and a feedback link including a drive coil for reversing the direction of movement of said toroidal mirror in response to the signal from said sensor.

4. The apparatus as claimed in claim 1 wherein said support at its rest position disposes the leading edge of said toroidal mirror at the center of said beam path.

5. Apparatus for measuring an optical characteristic of a specimen comprising means defining a pair of sample regions, means for causing radiation to be transmitted along a beam path through one of said sample regions, a toroidal mirror disposed in said beam path to reflect radiation from said beam path for transmission to the other sample region, a support for said mirror mounted for rotation about a center of curvature of said mirror, a support drive for rotating said mirror about said center of curvature to move said mirror out of said beam path and allow transmission of radiation to said one sample region and detector means for sensing radiation in said sample regions.

6. The apparatus as claimed in claim 5 further including spring means for biasing said support to a rest position and wherein said support drive for said toroidal mirror is an oscillatory system that has a resonant frequency as a function of the mass of the toroidal mirror assembly and the characteristics of said spring means.

7. The apparatus as claimed in claim 6 wherein said support drive includes circuitry comprising a sensor for generating a signal in response to movement of said toroidal mirror and a feedback link including a drive coil for reversing the direction of movement of said toroidal mirror in response to the signal from said sensor.

8. The apparatus as claimed in claim 7 wherein said support at its rest position disposes the leading edge of said toroidal mirror at the center of said beam path.

9. Photometer apparatus comprising means defining a pair of sample regions, radiation detector means for sensing radiation emitted from each of said sample regions, indicator means coupled to said detector means for indicating radiation sensed by said detector means, a source of radiation means for causing radiation to be transmitted from said source along a beam path through one of said sample regions, a toroidal mirror disposed in said beam path to reflect radiation from said beam path for transmission to the other sample region, a support for said mirror mounted for rotation about a center of curvature of said mirror, a support drive for rotating said mirror about said center of curvature to move said mirror out of said beam path and allow transmission of radiation to said one sample region and means responsive to the movement of said mirror relative to said beam path to control said indicator means.

10. In a spectrophotometer, a monochromator having entrance and exit slits and means for transmitting monochromatic radiation along a beam path between said slits, means defining a first sample region having a sample center, an optical system for transmitting radiation in said beam path to said first sample region, said optical system including a first toroidal mirror for reflecting and focusing radiation in said beam path at the sample center of said first sample region, means defining a second sample region having a sample center, a second toroidal mirror disposed in said beam path between said exit slit and said first toroidal mirror for reflecting and focusing radiation from said beam path at the sample center of said second sample region, a support for said second mirror mounted for rotation about a center of curvature of said second mirror, and a support drive for periodically rotating said second mirror about said center of curvature for moving said second mirror out of said beam path and allowing transmission of radiation to said first mirror.

11. The apparatus as claimed in claim 10 further including spring means for biasing said support to a rest position and wherein said support drive for said second mirror is an oscillatory system that has a resonant frequency as a function of the mass of the second mirror assembly and the characteristics of said spring means.

12. The apparatus as claimed in claim 10 wherein said support drive includes circuitry comprising a sensor for generating a signal in response to movement of said second mirror and a feedback link including a drive coil for reversing the direction of movement of said second mirror in response to the signal from said sensor.

13. The apparatus as claimed in claim 10 wherein said support at its rest position disposes the leading edge of said second mirror at the center of said beam path.

14. A spectrophotometer for use in the vacuum ultraviolet region comprising an evacuable chamber defining entrance and exit slits, means in said chamber for transmitting monochromatic radiation along a beam path between said slits, means defining a first sample region having a sample center and a second sample region having a sample center, radiation detector means for sensing radiation emitted from each of said sample regions, indicator means coupled to said detector means for indicating radiation sensed by said detector means, a first toroidal mirror for reflecting radiation in said beam path passed by said exit slit, said first toroidal mirror focusing said radiation at the sample center of said first sample region, a second toroidal mirror disposed in said beam path between said exit slit and said first toroidal mirror for reflecting and focusing radiation from said beam path at the sample center of said second sample region, a support for said second mirror mounted for rotation about a center of curvature of said second mirror, a support drive for periodically rotating said second mirror about said center of curvature for moving said second mirror out of said beam path and allowing transmission of radiation of said first mirror, said second mirror, mirror support and support drive being mounted in an evacuable chamber, and means responsive to the movement of said second mirror relative to said beam path for controlling said indicator means.

15. The spectrophotometer as claimed in claim 14 further including spring means for biasing said support to a rest position and wherein said support drive for said second mirror is an oscillatory system that has a resonant frequency as a function of the mass of the second mirror assembly and the characteristics of said spring means.

16. The spectrophotometer as claimed in claim 15 wherein said support drive includes circuitry comprising a sensor for generating a signal in response to movement of said second mirror and a feedback link including a drive coil for reversing the direction of movement of said second mirror in response to the signal from said sensor.

17. The spectrophotometer as claimed in claim 16 wherein said sensor includes a coil responsive to a magnetic element carried by said mirror support, said feedback link includes an amplifier coupled to said coil, and said means for controlling said indicator means is responsive to the output of said amplifier.

18. The spectrophotometer as claimed in claim 17 wherein said support at its rest position disposes the leading edge of said second mirror at the center of said beam path, and said support drive oscillates said second mirror with sinusoidal movement of amplitude at least approximately twice the width of said beam of monochromatic radiation at said second mirror.

References Cited
UNITED STATES PATENTS

| | | | |
|---|---|---|---|
| 2,613,572 | 10/1952 | Mathieu | 88—14 |
| 3,022,704 | 2/1962 | Cary | 88—14 |

WILLIAM F. LINDQUIST, *Primary Examiner.*